United States Patent

Obata et al.

[11] Patent Number: 6,062,123
[45] Date of Patent: May 16, 2000

[54] POWER STEERING SYSTEM AND STEERING-ANGLE DETECTING DEVICE FOR USE THEREIN

[75] Inventors: Yoshifumi Obata, Sakurai; Katsuhiro Hashimoto, Kashiwara; Osamu Miyazaki, Kashiahara, all of Japan

[73] Assignee: Koyo Seiko Co., Ltd., Osaka, Japan

[21] Appl. No.: 09/118,937

[22] Filed: Jul. 20, 1998

[30] Foreign Application Priority Data

Jul. 29, 1997 [JP] Japan ................................. 9-219083
Apr. 9, 1998 [JP] Japan ................................. 10-097382

[51] Int. Cl.⁷ ................................................... F15B 9/10
[52] U.S. Cl. .......................... 91/375 A; 180/422; 180/426
[58] Field of Search ............................. 91/375 R, 375 A; 180/422, 446

[56] References Cited

U.S. PATENT DOCUMENTS

| | | | |
|---|---|---|---|
| 4,765,427 | 8/1988 | Yonker | 91/375 A X |
| 4,778,021 | 10/1988 | Morishita et al. | 180/446 |
| 4,871,040 | 10/1989 | Zuraski et al. | 180/422 |
| 4,886,137 | 12/1989 | Pawlak | 180/446 |
| 5,119,898 | 6/1992 | Eckhardt et al. | |

FOREIGN PATENT DOCUMENTS 0 381 963  1/1990  European Pat. Off. .
63-317702  12/1988  Japan .

*Primary Examiner*—Hoang Nguyen
*Attorney, Agent, or Firm*—Jacobson, Price, Holman & Stern, PLLC

[57] ABSTRACT

Within a valve housing of a power steering system, an object ring portion formed of a magnetic material and with ridges and troughs at its outer circumference is mounted to an input shaft, and a sensor including a Hall element is disposed in opposed relation to the object ring portion.

4 Claims, 5 Drawing Sheets

F I G. 2
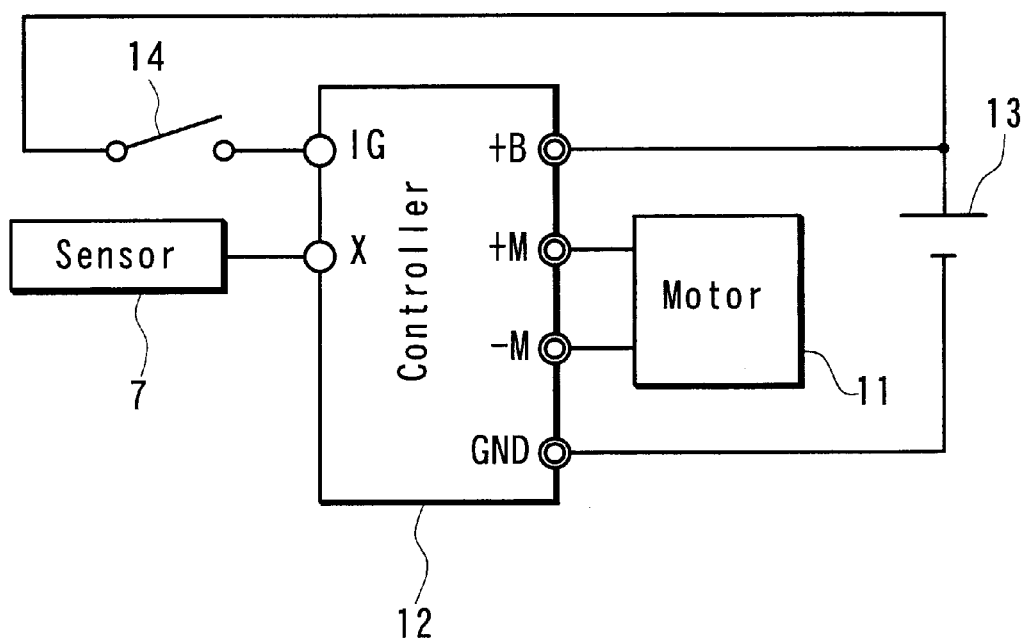

POWER STEERING SYSTEM AND STEERING-ANGLE DETECTING DEVICE FOR USE THEREIN

FIELD OF THE INVENTION

The present invention generally relates to a power steering system.

DESCRIPTION OF THE PRIOR ART

In the conventional power steering system employing motor pumps for oil hydraulic feed, the motor pump keeps its motor rotating at a low rotational speed for energy saving in a standby mode in which a steering wheel is not operated. When a driver operates the steering wheel, a torsion bar of the steering system is twisted to change an oil flow path in a rotary valve so that resistance of an oil hydraulic circuit is increased to raise pressure thereof. With increase in the circuit pressure, load on the motor is increased, resulting in an increased motor current. In a case where this increase of the motor current exceeds a predetermined level, an increased voltage is applied to the motor for increasing the rotational speed thereof, thereby putting the power steering system into a power mode. As a result, a sufficient flow of hydraulic oil is supplied to a hydraulic cylinder of the power steering system for production of an assisting steering force. That is, the power steering system is adapted to shift to the power mode based on the increase in the oil pressure resulting from the steering wheel operation.

On the other hand, there has been disclosed, in Japanese Unexamined Patent Publication No.63(1988)317702, a power steering system wherein a gear box contains: magnetic-pole drums disposed at places on a steering-shaft side and a wheel side; and a magnetic sensor for detection of magnetism of these drums. This apparatus is arranged such that a torque (steering force) applied to the steering shaft and a turning angle (steering angle) thereof are detected based on relative and absolute quantity of rotation of the pair of magnetic-pole drums so that the steering force is assisted based on the detection. That is, the system utilizes the sensor for direct detection of the steering force and the steering angle so as to produce the assisting steering force based on the detection.

The former of the above power steering systems has an adequate flow of the motor pump for effecting the oil pressure rise in the normal moderate operation of the steering wheel and hence, the steering system is smoothly shifted to the power mode. In the case of a quick operation of the steering wheel, however, a great flow of hydraulic oil into the hydraulic cylinder of a steering gear is required so that a flow of hydraulic oil to the rotary valve becomes short of an absolute quantity to be supplied. As a result, the oil pressure becomes hard to rise and the quick shift to the power mode fails. Aside from this drawback, the increased oil pressure causes expansion of a rubber hose used for a hydraulic oil path interconnecting the motor pump and the hydraulic cylinder of the steering gear, and this expansion results in a temporary drop of fluid resistance of the flow path. This leads to a time lag in the occurrence of the pressure rise. As a consequence, a responsibility of the assisting steering force is lowered.

The latter of the prior-art power steering systems does not depend upon oil pressure for production of the assisting steering force. Instead, the system utilizes the magnetic sensor for direct detection of the steering force and angle so as to produce the assisting steering force based on the detection. Therefore, the system has an excellent responsibility of the assisting steering force. However, a magnetizing process for preparing the magnetic-pole drum is not easy. In addition, since two pieces of magnetic-pole drums are required, the fabrication of the system takes a long time.

In short, if the system without the sensor is to detect the operation of the steering wheel based on variation of the oil pressure, a poor responsibility of the assisting steering force results. If, on the other hand, the system includes the sensor for ensuring the excellent responsibility of the assisting steering force, the fabrication thereof is difficult.

OBJECT AND SUMMARY OF THE INVENTION

It is therefore, an object of the invention to provide a steering-angle detecting device easy to fabricate and a power steering system employing this device and featuring an excellent responsibility of the assisting steering force.

For achieving the above object, a steering-angle detecting device for a power steering system of the present invention comprises:

an input shaft having a bore formed at its outer circumference;

an object ring portion formed of a magnetic material and into a predetermined shape, and mounted to an input shaft within a valve housing of the power steering system;

a sensor including a Hall element and disposed in said valve housing in opposed relation to said object ring portion;

a pulser ring including said object ring portion and a mounting portion extended from said object ring portion axially of said input shaft, said pulser ring being fitted around said input shaft and having an inside diameter greater than an outside diameter of a portion of said input shaft having the pulser ring thereon, said mounting portion being formed with a threaded through-hole extending from an outer circumference to an internal circumference thereof; and a bolt screwed into said through-hole and tightened up with its end portion received by said bore.

In the steering-angle detecting device of this construction, the steering wheel operation causes the object ring portion to revolve as carried on the input shaft, while the sensor magnetically senses the revolution of the object ring portion. The object ring portion is simply formed of the magnetic material and into the predetermined shape. Therefore, the object ring portion negates a need for difficult processing such as magnetization, thus facilitating fabrication of the device. In addition, a combined use of the ring portion with the sensor including the Hall element provides a less costly steering-angle detecting device.

Also, by tightening up the bolt, the input shaft and the pulser ring are secured to each other via the bolt. Where the pulser ring thus mounted is found to be defective, the bolt is removed before dismounting the pulser ring from the input shaft. In constructions in which the pulser ring is forcibly fitted around the input shaft, the removal of the pulser ring once mounted is so difficult that a whole body of the device including the input shaft must be replaced. In contrast, according to the construction of the present invention, a gap is provided between the input shaft and the pulser ring, and therefore the removal of the pulser ring is quite easy.

Again for achieving the above object, a power steering system of the present invention in which a valve in a valve housing is supplied with fluid by a motor pump, comprises:

an object ring portion mounted to an input shaft within the valve housing and formed of a magnetic material, the object ring portion having continuous ridges and troughs at its outer circumference;

a sensor including a Hall element and disposed within the valve housing in opposed relation to the ridges and troughs of the object ring portion for issuing a pulse string corresponding to the ridges and troughs;

motor-current detecting part for detecting a current flowing through a drive motor of the motor pump;

motor-driving-voltage determining part for determining a voltage V1 to drive the motor based on a quantity of current variation and a voltage V2 to drive the motor based on a number of pulses per time issued from the sensor, said motor-driving-voltage determining part determining a motor driving voltage based on a sum of the voltages V1+V2; and motor driver for supplying the motor driving voltage to the motor.

In the power steering system of this construction, the steering wheel operation causes the object ring portion to revolve as carried on the input shaft. The ridges and troughs of the rotating object ring portion pass on the front of the sensor to thereby cause change in magnetic reluctance and hence, a magnetic field of the Hall element is varied. Based on the variation of the magnetic field, the sensor issues the pulse string. The motor-driving-voltage determining part decides the voltage V1 to drive the motor based on the quantity of variation in the current flowing through the drive motor of the motor pump and also the voltage V2 to drive the motor based on the number of pulses per time issued from the sensor, thereby determining the motor driving voltage based on the sum of the voltages V1+V2. That is, in the case of a quick operation of the steering wheel, a voltage V2 of a magnitude corresponding to a steering velocity is produced based on an output from the sensor such that the motor driving voltage may be increased accordingly. Such an increase in the driving voltage speeds up the rotation of the motor pump so as to secure a required flow of the hydraulic oil and thus, the assisting steering force is produced without delay. In this manner, the responsibility of the assisting steering force is enhanced.

BRIEF DESCRIPTION OF THE DRAWINGS

FIG. 2 is a schematic diagram of a control circuit of a motor of a motor pump for supplying hydraulic oil to a rotary valve in FIG. 1;

DESCRIPTION OF THE PREFERRED EMBODIMENTS

Now, preferred embodiments of the invention will hereinafter be described with reference to the accompanying drawings.

Figure 1:
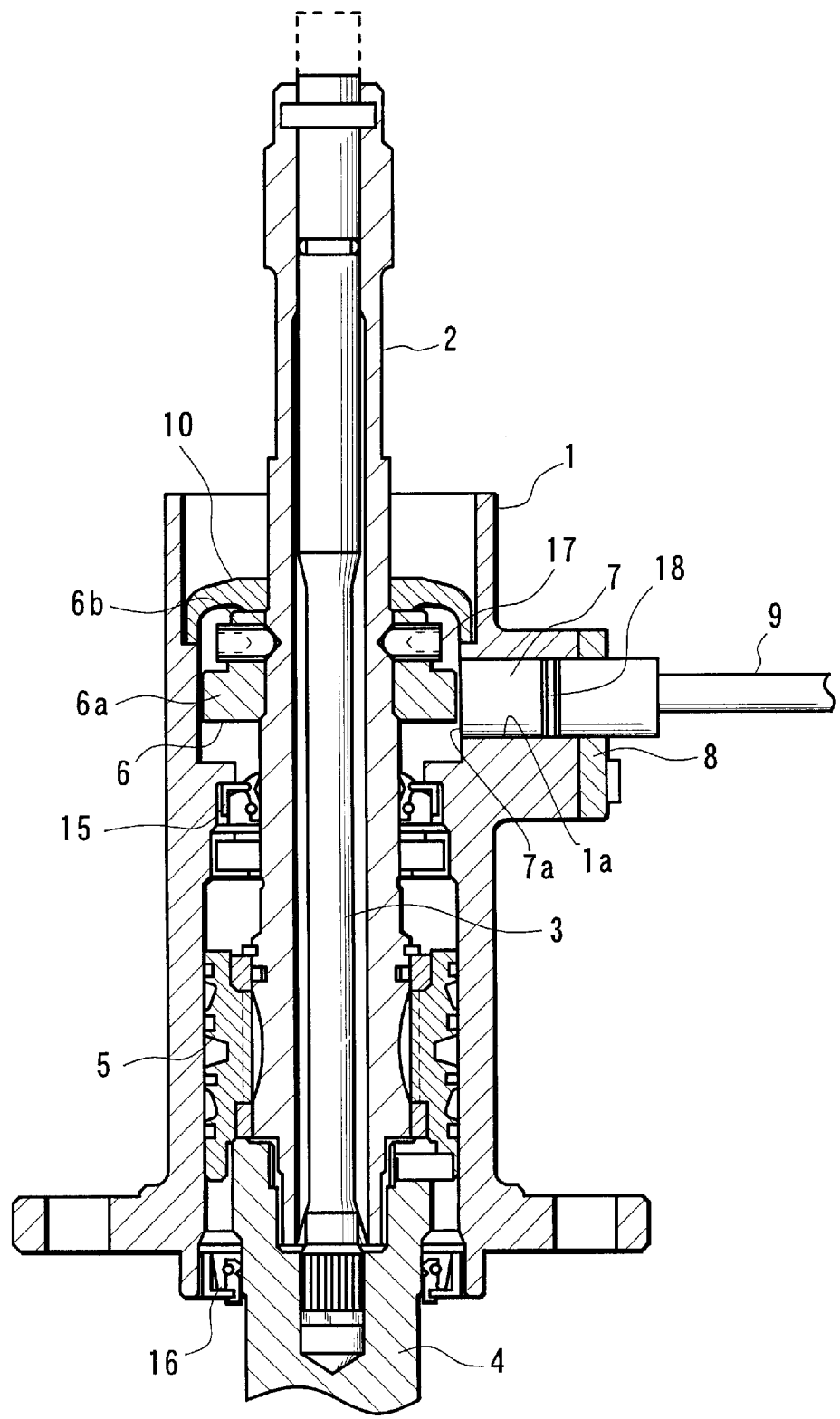
FIG. 1 is a sectional view showing a steering angle detecting device of a power steering system in accordance with one embodiment of the present invention.

FIG. 1 is a sectional view of a steering-angle detecting device of a power steering system according to one embodiment of the present invention.

Referring to FIG. 1, an input shaft 2 and a torsion bar 3 are coupled to a steering wheel (not shown) and extend through a central portion in a valve housing 1. The input shaft 2 has its end on a steering-wheel-side (the upper end as seen in the figure) retained in mutually secured relation with the torsion bar 3 and the other end thereof rotatably retained at place. The torsion bar 3 is connected to an output shaft 4 at its lower end.

A steering force (torque) applied to the input shaft 2 is transmitted to the output shaft 4 via the torsion bar 3. Accordingly, a quantity of torsion of the torsion bar 3 brings a relative difference between quantities of rotation of the input shaft 2 and the output shaft 3. A rotary valve 5 known to the art is arranged to utilize this relative difference in the quantity of rotation. The rotary valve 5 is provided with oil seals 15 and 16 at upper and lower portions thereof with respect to an axial direction.

Within the valve housing 1, a pulser ring 6 of a magnetic material is disposed on an outer circumference of the input shaft 2 at place above the oil seal 15. The pulser ring 6 includes an object ring portion 6a shaped like a ring and a mounting portion 6b extending from the object ring portion 6a along the axial direction of the input shaft 2. The pulser ring 6 is fitted around the input shaft 2 and is coaxially fixed thereto by means of two or more bolts 17 which are inserted through the mounting portion 6b to engage the input shaft 2. Therefore, the pulser ring 6 revolves in synchronism with the input shaft 2. The object ring portion 6a of the pulser ring 6 is formed with plural continuous ridges and troughs in a gear-like configuration on an outer circumferential surface thereof.

A mounting hole 1a is formed at a lateral side of the valve housing 1, and a sensor 7 is inserted in the mounting hole 1a as extending toward an axis of the input shaft 2 and fixed therein by means of a fitting member 8. The sensor 7 has an O-ring 18 fitted around an outer circumference thereof. An end 7a of the sensor 7 opposes the object ring portion 6a of the pulser ring 6 across a minute gap therebetween. The sensor 7 includes a Hall element, and a magnetic field detected by the Hall element is varied in response to change of magnetic reluctance corresponding to the ridges and troughs on the outer circumference of the object ring portion 6a of the pulser ring 6. An output signal of the sensor 7 is thereby varied. The output signal is transmitted to a predetermined circuit (described hereinafter) via a cable 9. Adjoining the pulser ring 6 is a dust cover 10 for preventing invasion of dirt and dust.

Figure 6:
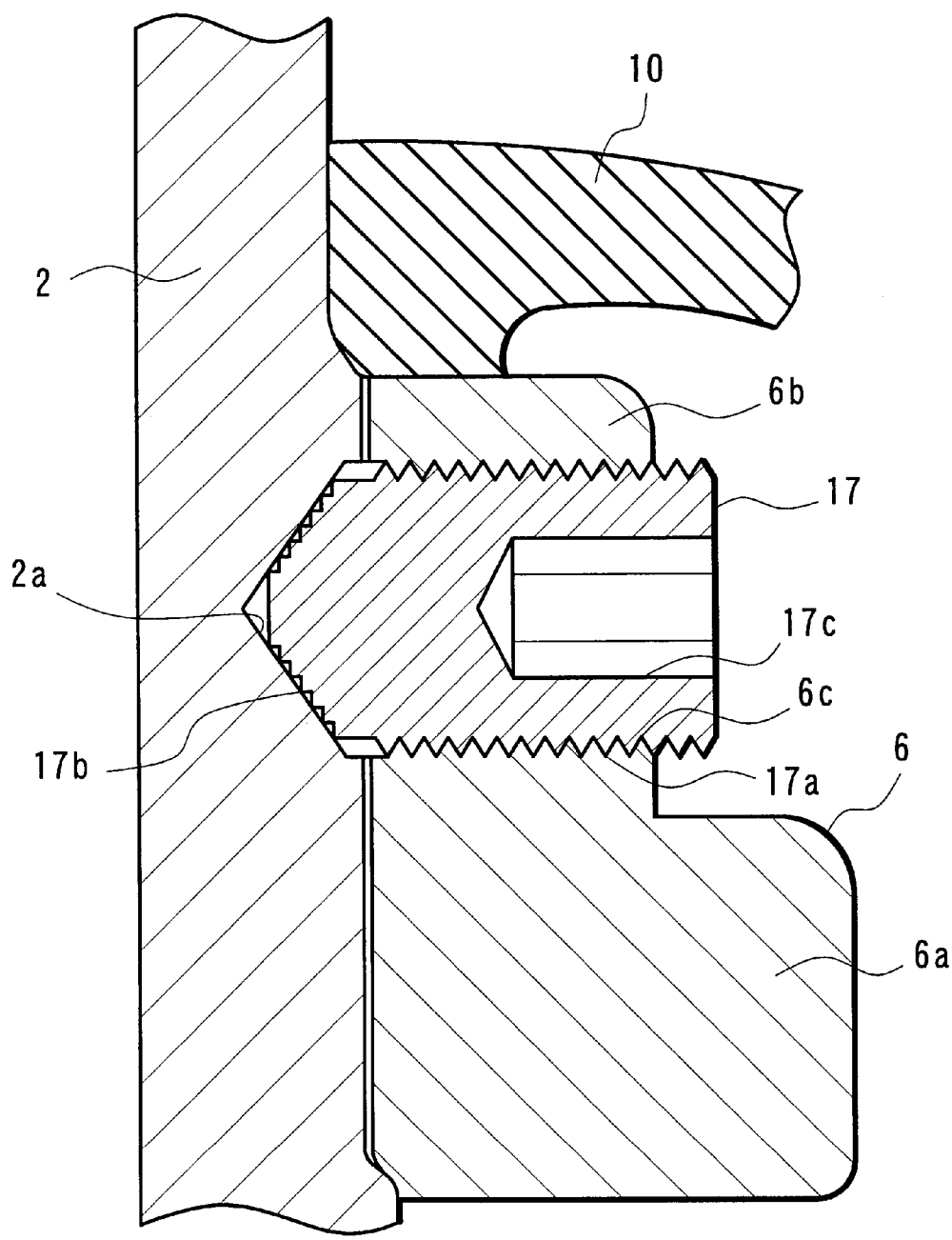
FIG. 6 is a fragmentary enlarged view in section showing a peripheral portion of a pulser ring of FIG. 1.

FIG. 6 is a fragmentary enlarged view in section for illustrating a peripheral portion of the pulser ring 6. Referring to the figure, the bolt 17 has an external thread 17a formed on its outer circumference, a serration 17b (surfaced into a saw-tooth shape in section) formed at a tapered end portion thereof, and a hexagon hole 17c formed internally thereof. The external thread 17a is coated with resin. The mounting portion 6b of the pulser ring 6 is formed with a threaded through-hole 6c extending from its outer circumference to its internal circumference (or extending radially). The input shaft 2 is formed with a conical bore 2a at its outer circumferential portion. An inside diameter of the pulser ring 6 is slightly greater than an outside diameter of a portion of the input shaft 2 around which the pulser ring 6 is fitted. Accordingly, there is a minute gap between the input shaft 2 and the pulser ring 6.

The following procedure is used in mounting the pulser ring 6 to the input shaft 2. First, the pulser ring 6 is fitted around the input shaft 2, and position of the pulser ring 6 is adjusted to have an alignment of the through-hole 6c with the conical bore 2a. As described above, the pulser ring 6 has the inside diameter slightly greater than the outside diameter of the input shaft 2, so that the pulser ring 6 may merely be put around the input shaft but need not be forcibly fitted therearound. Therefore, the pulser ring 6 is not subjected to a stress associated with the forcible fitting thereof. Subsequently, the bolt 17 is screwed into the through-hole 6c with a tool engaged to the hexagon hole 17c. In screwing the bolt 17, the rotated bolt 17 has its end portion guided into the conical bore 2a thereby bringing the pulser ring 6 into small movement relative to the input shaft 2. Thus, the center of the through-hole 6c comes into precise alignment with the center of the conical bore 2a.

By tightening up the respective bolts 17, the input shaft 2 and the pulser ring 6 are secured to each other via the volts 17. Additionally, tightening up of each of the bolts 17 causes the serration 17b to slightly cut into a surface of the bore 2a. This is effective to increase a static frictional force between the bolts 17 and the input shaft 2 for prevention of backlash of the pulser ring 6 caused by vibration or the like transmitted to the input shaft 2 from external sources. The backlash of the pulser ring 6 is also prevented by the resin coating on the external threads 17a which fills minute gaps between the external threads 17a and the threaded through-hole 6c. Additionally, the resin coating is also effective to prevent loosening of the bolts 17 and permeation of water from the heads (the right side of FIG. 6) of the bolts 17.

In a case where the pulser ring 6 thus mounted is found to be defective, the bolts 17 are removed before dismounting the pulser ring 6 from the input shaft 2. In the construction in which the pulser ring 6 is forcibly fitted around the input shaft, the removal of the pulser ring 6 once mounted is so difficult that a whole body of the device including the input shaft must be replaced. In contrast, the construction of the embodiment provides the gap between the input shaft 2 and the pulser ring 6 and therefore, the removal of the pulser ring is quite easy.

In the steering-angle detecting device of the above construction, the rotation of the input shaft 2 associated with the steering wheel operation causes the object ring portion 6a of the pulser ring 6 to revolve. The object ring portion 6a allows the ridges and troughs thereof to pass on the front of the sensor 7 by a number corresponding to a quantity of revolution of the pulser ring. The sensor 7 senses this number of ridges and troughs as changes in the magnetic reluctance and issues a pulse string corresponding to the number of changes in the magnetic reluctance. The higher the rotational speed of the input shaft 2 is, the greater the number of pulses per unit time is.

FIG. 2 is a schematic diagram of a control circuit of a motor 11 of a motor pump for supplying hydraulic oil to the rotary valve 5.

Referring to the figure, the motor 11 has its motor terminals +M and −M connected to a controller 12. A battery 13 (car battery) is connected to the controller 12 at a power terminal +B and a ground terminal GND thereof. An ignition key switch 14 is connected to a positive pole of the battery 13 and to an ignition key terminal IG of the controller 12. The sensor 7 is connected to the controller 12 at a sensor terminal X thereof. Incidentally, a wire connecting the sensor 7 to a control power source is omitted in the Figure.

Figure 3:
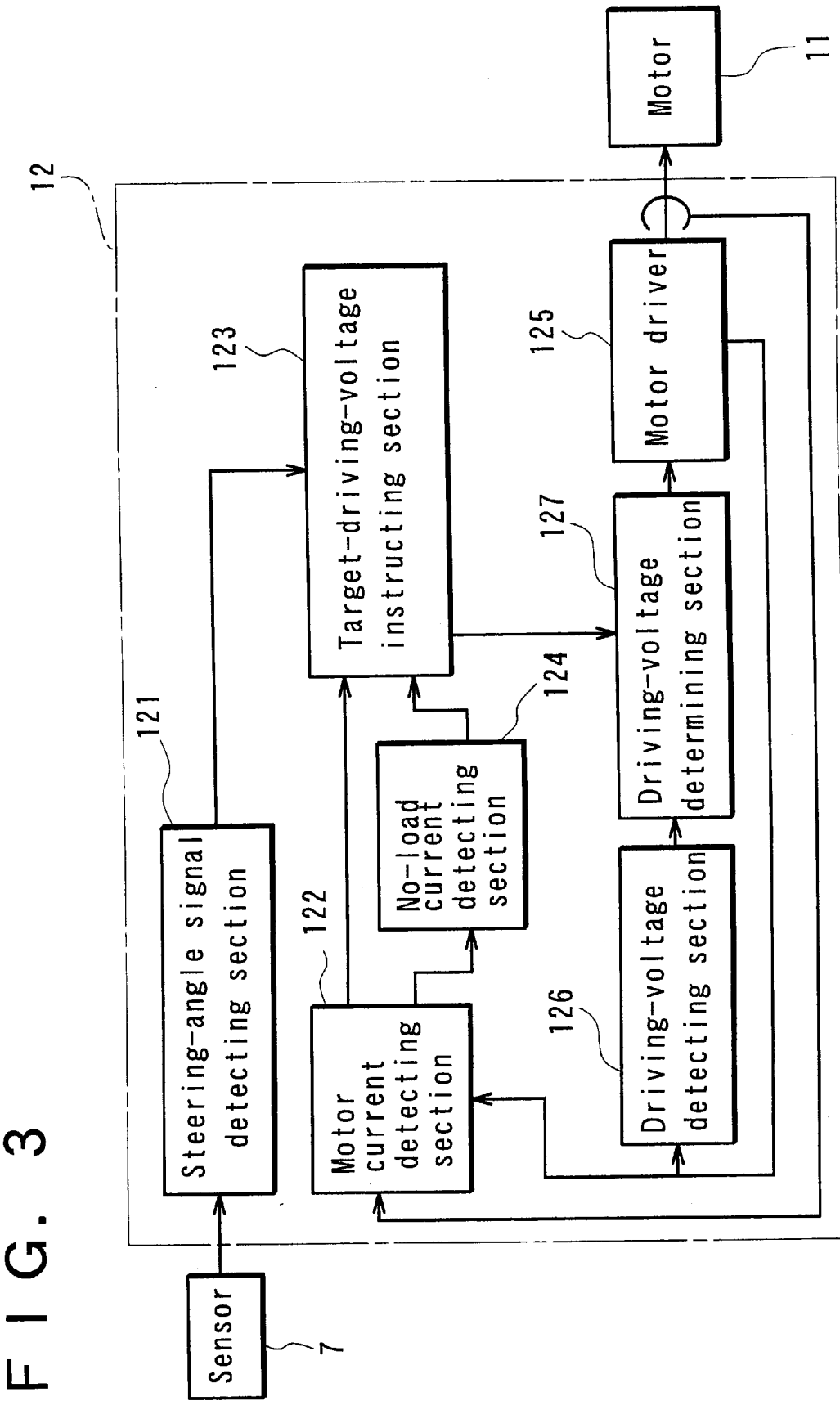
FIG. 3 is a block diagram showing an internal arrangement of a controller of FIG. 2.

FIG. 3 is a block diagram showing an internal arrangement of the controller 12. The controller 12 includes: a steering-angle signal detecting section 121 responsive to an output from the sensor 7; a motor-current detecting section 122 for detection of current through the motor 11; a target-driving-voltage instructing section 123 responsive to outputs from the steering-angle signal detecting section 121 and the motor-current detecting section 122; a no-load current detecting section 124 interposed between the motor-current detecting section 122 and the target-driving-voltage instructing section 123; a motor driver 125 for driving the motor 11; a driving-voltage detecting section 126 for detection of a driving voltage of the motor driver 125; and a driving-voltage determining section 127 responsive to outputs from the driving-voltage detecting section 126 and the target-driving-voltage instructing section 123.

Now, description will be made on control operations carried out in the control circuit of the motor 11 shown in FIG. 2 and FIG. 3.

First, the controller 12 is actuated by turning on the ignition key 14 to start a standby mode control. The standby mode control is to perform a PWM control via the motor driver 125 for regulating a driving voltage for the motor 11, which is issued from the motor driver 125 and detected by the driving-voltage detecting section 126, to be a given value Va[V]. This keeps the motor 11 rotated at a given low speed for supplying the hydraulic oil to the power steering system at a given quantity of flow.

On the other hand, when the steering wheel is not yet operated, a current flowing through the motor 11 under no load is detected by the motor-current detecting section 122 and the no-load current detecting section 124.

Figure 4:
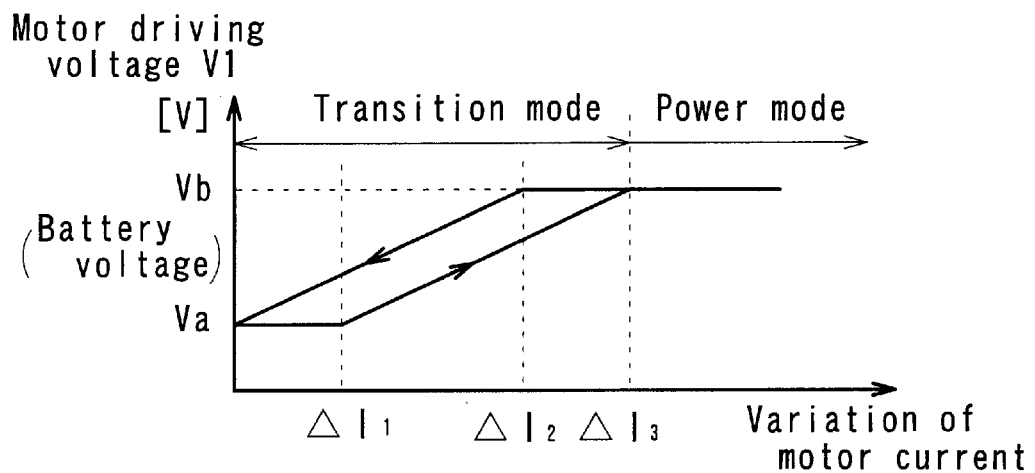
FIG. 4 is a graphical representation for illustrating a relation between the quantity of variation in current supplied from the above controller to the motor and the motor driving voltage.

With the steering wheel operation, the load on the motor 11 is increased to vary (increase) the current supplied to the motor 11. The target-driving-voltage instructing section 123 detects this quantity of motor-current variation from a difference between outputs from the motor-current detecting section 122 and from the no-load current detecting section 124. FIG. 4 is a graph of a characteristic line illustrating how the target-driving-voltage instructing section 123 varies the motor driving voltage V1 against the quantity of motor-current variation. For instance, the motor driving voltage V1 is maintained at Va[V] against quantity of motor-current variation of up to $\Delta I_1[A]$. When the quantity of motor-current variation exceeds $\Delta I_1[A]$, the motor driving voltage V1 is increased proportionally to increase in the quantity of motor-current variation by means of the PWM control. When the quantity of motor-current variation reaches $\Delta I_3[A]$ so that the motor driving voltage V1 becomes equal to a battery voltage (Vb[V]), the system control is shifted to a power mode. The power mode control is to set the PWM control to a duty ratio of 100% under the motor driving voltage equal to the battery voltage. A condition in which the system control is shifted from the standby mode to the power mode is referred to as "transition mode". Variation characteristics of the motor driving voltage V1 in the transition mode has hysteresis shown in the Figure. That is, the motor driving voltage presents different characteristics between a shift from the standby mode to the power mode and a shift from the power mode to the standby mode. During the shift from the power mode to the standby mode, the motor driving voltage V1 is decreased proportionally to decrease in the quantity of motor-current variation at the time when and after the quantity of motor-current variation decreases to $\Delta I_2[A]$ ($\Delta I_2 < \Delta I_3$).

The aforementioned control is carried out based on the quantity of motor-current variation. On the other hand, another control is carried out based on the output from the sensor 7 in a manner described as below.

Figure 5:
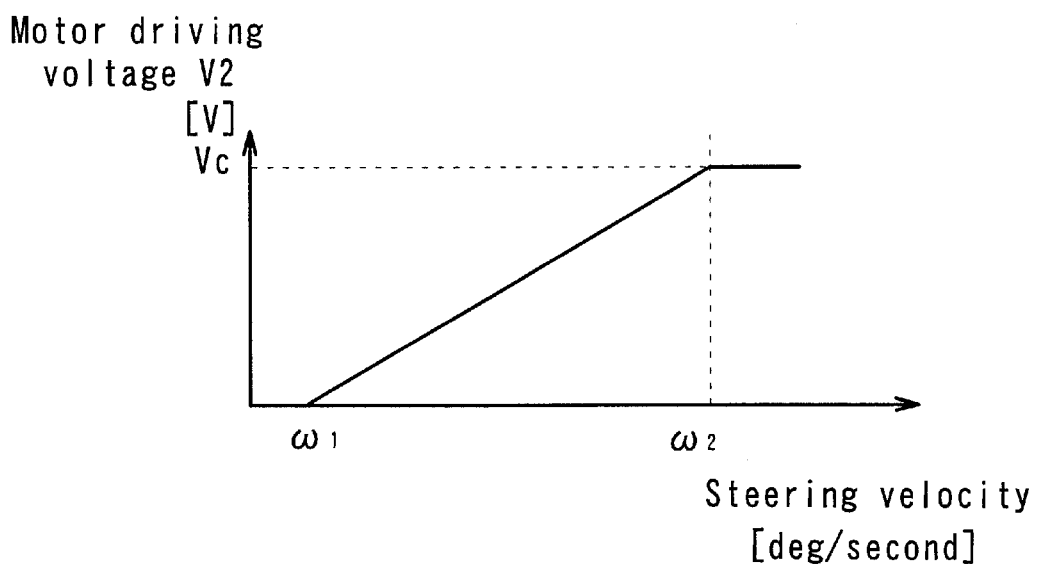
FIG. 5 is a graphical representation for illustrating a relation between the steering velocity supplied by the above controller and the motor driving voltage.

As described in the foregoing, the output signal from the sensor 7 is composed of a pulse string, which is received by the steering-angle signal detecting section 121. The steering-angle signal detecting section 121 counts a number of pulses inputted per unit time to determine a steering velocity per second (angle/sec). The resultant steering velocity is supplied to the target-driving-voltage instructing section 123. The target-driving-voltage instructing section 123 determines a motor driving voltage to be issued in response to the steering velocity with a given relation. FIG. 5 is a graphical representation of the relation between the steering velocity and the motor driving voltage V2. As seen in the figure, when the steering velocity is in the range from $\omega_1$[deg/sec] to $\omega_2$[deg/sec], the motor driving voltage V2 is increased proportionally to increase in the steering velocity. When the steering velocity is not smaller than $\omega_2$[deg/sec], the motor driving voltage V2 is maintained at a constant level of Vc[V]. When the steering velocity is less than $\omega_1$[deg/sec], the motor driving voltage V2 is not issued.

The target-driving-voltage instructing section 123 adds the motor driving voltage V1 based on the quantity of motor-current variation (FIG. 4) and the motor driving voltage V2 based on the steering velocity (FIG. 5). The resultant sum V1+V2, as the motor driving voltage, is supplied to the driving-voltage determining section 127. It is to be noted that when the voltage sum V1+V2 exceeds the battery voltage, the battery voltage is supplied as the motor driving voltage.

When the steering velocity is equal to or less than $\omega_1$[deg/sec] in the normal moderate operation of the steering wheel, there is no output of the motor driving voltage V2 based on the steering velocity, but only the motor driving voltage V1 based on the quantity of motor-current variation is supplied to the motor 11 from the motor driver 125. Accordingly, the motor pump for supplying the hydraulic oil to the rotary valve 5 is rotated at a rotational speed corresponding to the motor driving voltage based only on the characteristics of FIG. 4, thus supplying the power steering system with the flow of hydraulic oil based on the rotational speed of the motor pump.

On the other hand, when the steering velocity exceeds $\omega_1$[deg/sec] in the quick operation of the steering wheel, an output of the motor driving voltage V2 based on the steering velocity is issued and added to the motor driving voltage V1 based on the quantity of motor-current variation. Therefore, a predetermined motor driving voltage is issued when the motor current is not yet to vary. For instance, in the case of a very quick operation of the steering wheel at $\omega_2$[deg/sec], a motor driving voltage V2 of Vc[V] is issued based on the characteristic of FIG. 5. At this time, the motor current is not yet to vary or starting to vary by a small degree. Accordingly, a motor driving voltage V1 against the quantity of current variation is equal to or slightly greater than Va[V]. However, this motor driving voltage V1 is added to the aforesaid motor driving voltage V2 (=Vc[V]) by the target-driving-voltage instructing section 123. Therefore, the resultant sum of the motor driving voltages is not smaller than (Va+Vc)[V]. As a result, there is an output of the motor driving voltage within an actually available range of the battery voltage, and such a voltage is applied to the motor 11 by the motor driver 125. This provides a quick increase in the rotational speed of the motor 11 for supplying a sufficient flow of hydraulic oil to the power steering system. Thus, a required assisting steering force is produced without delay.

As described in the foregoing, the responsibility of the assisting steering force for the quick operation of the steering wheel is enhanced by the steps of: detecting a steering velocity from an output of the sensor 7, determining a motor driving voltage based on the detected steering velocity, and adding the resultant motor driving voltage to a motor driving voltage to be issued based on a quantity of motor-current variation.

Although the pulser ring 6 and the sensor 7 are disposed at places above the oil seal 15 according to the foregoing embodiment hereof, the mounting of the pulser ring 6 should not be limited to the above but may be any place on the input shaft 2. For example, the pulser ring 6 may be interposed between the oil seal 15 and the rotary valve 5 (or within an oil chamber). Incidentally, in a case where only the steering angle is detected instead of the steering velocity, the pulser ring and sensor may be disposed somewhere on the output shaft 4.

What is claimed is:

1. A steering-angle detecting device for a power steering system, the device comprising:

an input shaft having a bore formed at its outer circumference;

an object ring portion formed of a magnetic material and into a predetermined shape, and mounted to an input shaft within a valve housing of the power steering system;

a sensor including a Hall element and disposed in said valve housing in opposed relation to said object ring portion;

a pulser ring including said object ring portion and a mounting portion extended from said object ring portion axially of said input shaft, said pulser ring being fitted around said input shaft and having an inside diameter greater than an outside diameter of a portion of said input shaft having the pulser ring thereon, said mounting portion being formed with a threaded through-hole extending from an outer circumference to an internal circumference thereof; and a bolt screwed into said through-hole and tightened up with its end portion received by said bore.

2. The steering-angle detecting device as set forth in claim 1, wherein said object ring portion is formed with continuous ridges and troughs on its outer circumference, and said sensor opposes said ridges and troughs.

3. The steering-angle detecting device as set forth in claim 1, wherein said bolt is formed with serration at said end portion.

4. A power steering system in which a valve of a valve using is supplied with a fluid by a motor pump, said power steering system comprising:

an object ring portion mounted to an input shaft within said valve housing and formed of a magnetic material, said object ring portion having continuous ridges and troughs at its outer circumference;

a sensor including a Hall element and disposed in said valve housing in opposed relation to the ridges and troughs of said object ring portion for issuing a pulse string corresponding to said ridges and troughs;

motor-current detecting part for detecting a current flowing through a drive motor of said motor pump;

motor-driving-voltage determining part for determining a voltage V1 to drive said motor based on a quantity of variation of said current and a voltage V2 to drive said motor based on a number of pulses per time issued from said sensor, said motor-driving-voltage determining part determining a motor driving voltage based on a sum of the voltages V1+V2; and motor driver for supplying said motor driving voltage to said motor.

\* \* \* \* \*